United States Patent [19]

Takamiya et al.

[11] Patent Number: 4,460,192
[45] Date of Patent: Jul. 17, 1984

[54] FRAME FOR FOLDING BICYCLE

[75] Inventors: Kikuzo Takamiya, Kitamoto; Hideyuki Ishibashi, Ageo, both of Japan

[73] Assignee: Bridgestone Cycle Co., Ltd., Tokyo, Japan

[21] Appl. No.: 441,133

[22] Filed: Nov. 12, 1982

[30] Foreign Application Priority Data

Nov. 16, 1981 [JP] Japan ................................ 56-182318

[51] Int. Cl.³ ................................................ B62K 15/00
[52] U.S. Cl. .................................... 280/287; 280/278; 280/639; 403/100
[58] Field of Search ................. 280/287, 278, 638, 38, 280/39, 40, 642, 643, 645, 646, 42, 279–281; 403/100, 102

[56] References Cited

U.S. PATENT DOCUMENTS

| 469,592 | 2/1892 | Parkes | 403/100 |
| 561,665 | 6/1896 | Hubbell | 403/100 |
| 3,990,717 | 11/1976 | Best | 280/287 X |
| 4,296,940 | 10/1981 | Herbert | 280/287 X |

FOREIGN PATENT DOCUMENTS 2651305  5/1978  Fed. Rep. of Germany ...... 280/287

Primary Examiner—Joseph F. Peters, Jr.
Assistant Examiner—Mitchell J. Hill
Attorney, Agent, or Firm—Jordan and Hamburg

[57] ABSTRACT

A frame for a folding bicycle includes a base frame having a triangular configuration, the base frame having a pair of back forks and a pair of lower stays joined to a pair of end members respectively. A main pipe is interconnected between the pair of back forks and the pair of lower stays, and a quadric link is connected to the triangular base frame. The guadric link includes the main pipe, a seat pipe, a front pipe, and an upper stay, along with a first pivot pivotally connecting the main pipe and the seat pipe to provide pivotal movement of the seat pipe relative to the main pipe, a second pivot pivotally connecting the main pipe and the front pipe to provide pivotal movement of the front pipe relative to the main pipe, a third pivot pivotally connecting the front pipe and the upper stay to provide pivotal movement between the front pipe and the upper stay, and a fourth pivot pivotally connecting the seat pipe and the upper stay to provide pivotal movement between the seat pipe and the upper stay. The quadric link further includes a foldable link extending between the first and the third pivots, the foldable link having a first position which maintains the quadric link in an uncollapsed condition and a second position in which the quadric link is in a collapsed condition. The foldable link further includes an operable device for maintaining the quadric link in the uncollapsed condition, the operable device being manually operable to permit the quadric link to be collapsed and folded to the collapsed condition.

9 Claims, 8 Drawing Figures

FRAME FOR FOLDING BICYCLE

BACKGROUND OF THE INVENTION

The present invention relates to a frame for a folding bicycle and more particularly to an arrangement of frame components for allowing the bicycle to be instantaneously unfolded or folded while also allowing the frame weight to be made as light as possible in order to facilitate carrying of the bicycle after being folded.

Conventional folding bicycle frames have such problems that the operation for unfolding, particularly folding, is troublesome and also the weight of the frame is high.

It is, therefore, an object of the present invention to provide a bicycle frame structure including a base frame with a frame structure which is triangular when viewed from the side and which has a quadric limited link frame assembled thereon. The frame is adapted to be unfoldable or foldable in order to facilitate the folding operation and moreover, mainly pipe material is employed in order to decrease the frame weight, wherein the frame parts are disposed so that buckling is prevented as much as possible and particularly tension is applied to an elongated frame member, which is large in weight, thereby to reduce the frame weight without impairing the strength.

DESCRIPTION OF THE PREFERRED EMBODIMENTS

Figure 1:
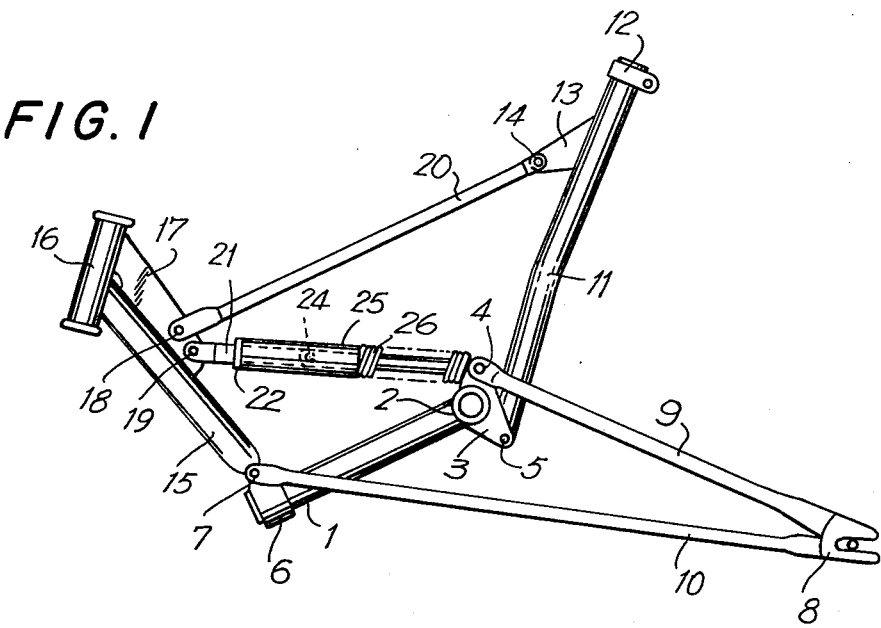
FIG. 1 is an elevational view of a frame for a folding bicycle according to one embodiment of the present invention.

A preferred embodiment of the present invention will be be described hereinunder with reference to the accompanying drawings. A hanger pipe 2 and a pair of hanger brackets 3 are provided at the upper end of a main pipe 1, while a front bracket 6 is provided at the lower end. The upper ends of the hanger brackets 3 and a rear end member 8 are connected by a back fork 9, and the front bracket 6 and the rear end member 8 are connected by a pair of lower stays 10, thereby to form a base frame which is triangular when viewed sideways. With the main pipe 1 defining one side of the triangle as a base, a shaft 5 is provided through the hanger brackets 3 provided at the upper end of the main pipe 1, and the lower end of a seat pipe 11 is rotatably connected to the shaft. The hanger brackets 3, hanger pipe 2 and shaft 5 constitute a first pivotal means. The upper end of the seat pipe 11 has a seat post fastening part 12 for mounting a saddle, and an upper bracket 13 is provided near the upper end of the seat pipe 11. In addition, a shaft 7 is also provided through the front bracket 6 at the lower end of the main pipe 1, and the lower end of the front pipe 15 is rotatably connected to the shaft 7. The shaft 7 and brackets 6 constitute a second pivotal means. A head pipe 16 to hold a handle-bar post and a front fork is secured to the upper end of the front pipe 15, and a head bracket 17 for dispersing the stress applied to the securing part is provided extending over the head pipe 16 and the upper end of the front pipe 15. Shafts 14, 18, constituting fourth pivotal means and third pivotal means, respectively, provided through the upper bracket 13 and the head bracket 17 respectively are connected with an upper stay 20 to form a quadric limited link frame capable of being folded at four joints between the main pipe 1, the seat pipe 11, the upper stay 20 and the front pipe 15 respectively. In addition, a link adapted to be bendable and stretchable is engaged between proper components of the quadric limited link frame so that it can be unfolded or folded.

In the present invention, the link is diagonally disposed between the head bracket 17 and the hanger brackets 3 in the members constituting the quadric limited link frame, and the link is adapted to be bendable and stretchable in order to facilitate unfolding and folding of the quadric limited link frame. Consequently, a shaft 19 is provided through the head bracket 17, and one end of a first link member 21 (hereinafter link) is pivotably attached to the shaft 19. The link 21 has a stop element or stepped part 22 with a diameter which is a size larger than that of the main body. A shaft 4 is also provided through the hanger brackets 3, and one end of a second link member 23 (hereinafter link) is pivotably attached to the shaft 4. A pivot shaft 24 is provided through the other ends of the respective links 21 and 23 so that the links 21 and 23 are pivotable with the shaft 24 as a pivoting center. A support collar 25 extending over both the links 21 and 23 is slidably disposed, and a compression spring 26 is disposed on the side of the link 23 so as to constantly press the support collar 25 toward the stepped part 22 of the link 21. In the preferred embodiment of the present invention, the shafts 18, 19 are separately provided on the head bracket 17. However, these shafts may be the same. On the other hand, the positions of the shafts 4, 19 are selected so that the line of action of the compression force at the position of the shaft 4 and that at the position of the shaft 19 face each other on the same line, thereby to allow only the force in the axial direction of the link to be applied to the point shaft 24 of the link as much as possible. By covering the outside of the compression spring 26 with a coating material, durability is improved and also safety is ensured.

Figure 7:
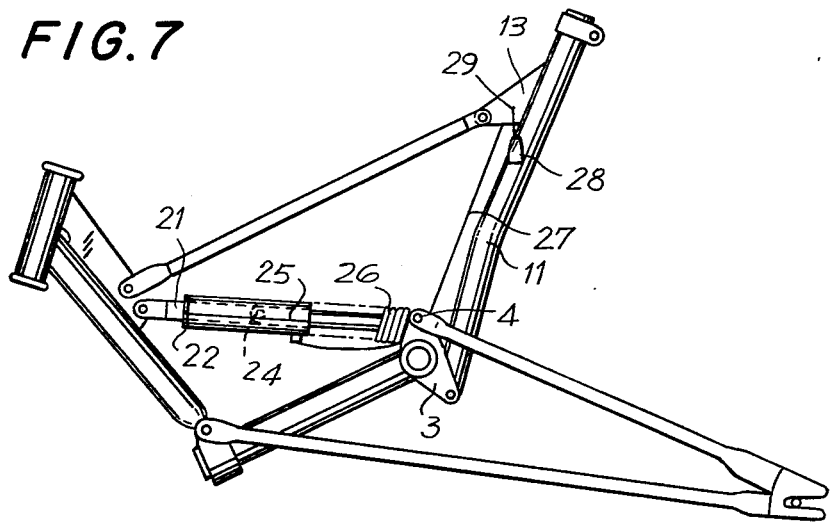
FIG. 7 is an elevational view of another preferred embodiment.
Figure 8:
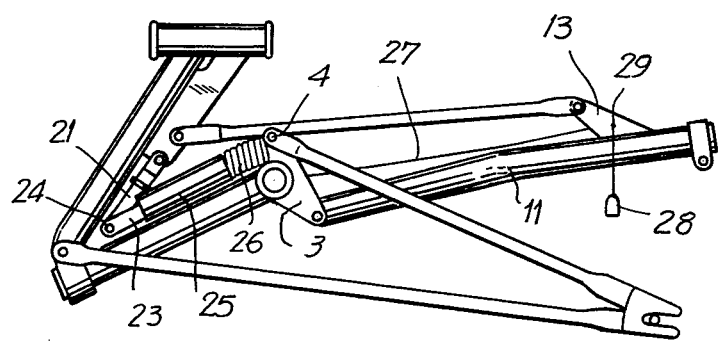
FIG. 8 is an elevational view of the second preferred embodiment in a folded state.

Another preferred embodiment is such that, as shown in FIGS. 7 and 8, in order to allow the slide of the support collar 25 to be remotely controlled, one end of a cord 27 is connected to a portion of the support collar 25. The cord 27 is passed once below the axial center line of the link, then passed under the shaft 4 of the hanger brackets 3 and inserted through a receiving bore 29 provided in the upper end part of the seat pipe 11, e.g., in the upper bracket 13, and a tag 28 is connected to the open end of the cord 27.

Since the present invention has such an arrangement as described above, the quadric limited link frame is unfolded or folded with the triangular base frame as a base. In the quadric limited link frame, the support collar 25 is disposed over the links 21 and 23 and the link diagonally inserted between the hanger brackets 3 and the head bracket 17, and the support collar 25 is resiliently brought into contact with the stepped part 22 of the link 21 by means of the compression spring 26 at all times and moreover, the support collar 25 covers the periphery of the joint between the links 21 and 23 including the pivot shaft 24. Therefore, the links 21 and 23 cannot bend and consequently form a beam to secure the quadric limited link frame in an unfolded state. Removing the securing for the unfolded state of the quadric limited link frame permits the frame to be folded in such a direction that the seat pipe 11 is rearward inclined as shown in FIG. 2.

Figure 2:
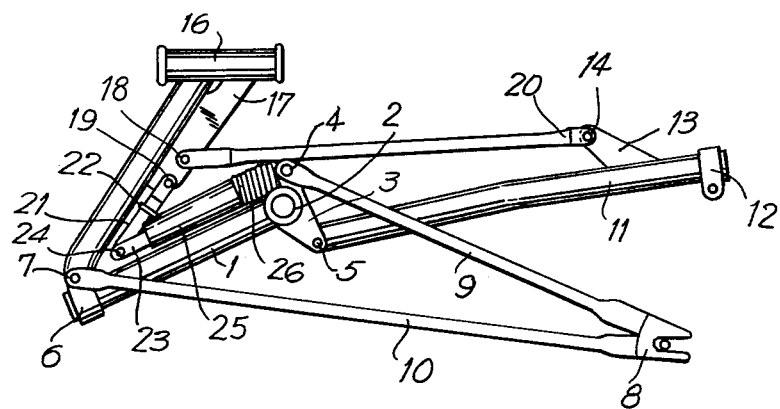
FIG. 2 is an elevational view of the frame in a folded state.
Figure 4:
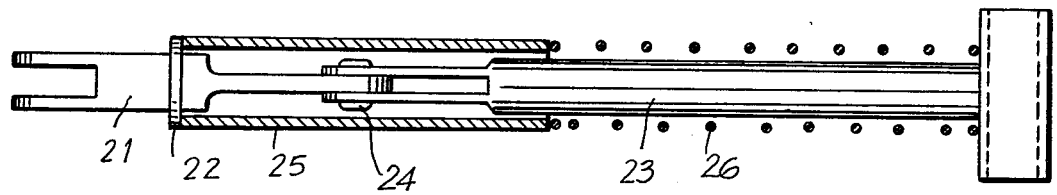
FIG. 4 is a partly sectioned elevational view of the link rotated ninety degrees from the FIG. 3 position.
Figure 3:
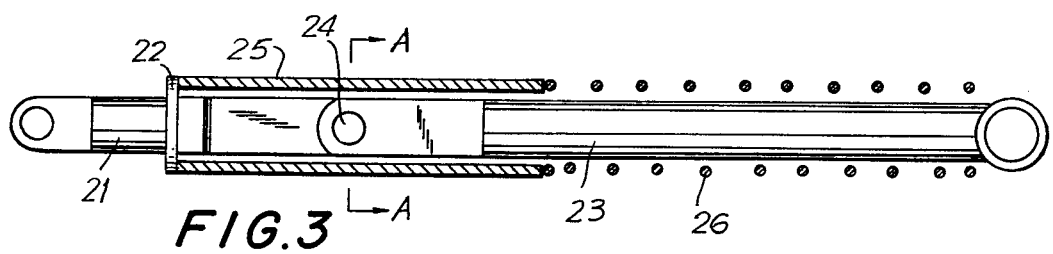
FIG. 3 is a partly sectioned elevational view of a link.
Figure 5:
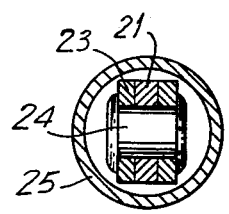
FIG. 5 is a sectional view taken along the line A—A of FIG. 3.
Figure 6:
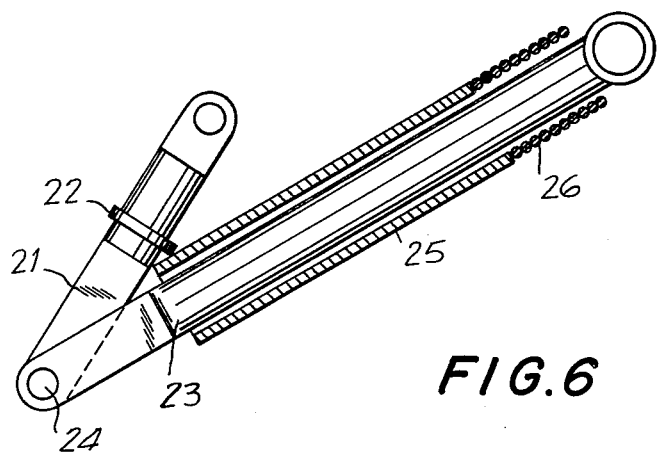
FIG. 6 is a partly sectioned side elevational view of the link being folded in two.

Accordingly, when the support collar 25 is slid toward the side of the shaft 4 against the compression spring 26 so that the joint between the links 21 and 23 is exposed, and moreover, a force for moving the pivot shaft 24 toward the shaft 7 is applied in order to remove the securing for the unfolded state of the quadric limited link frame, the links 21 and 23 are folded in two as shown in FIG. 2 and also the quadric link is forcedly brought into a folded state.

In case of remotely controlling the sliding of the support collar 25 according to the second preferred embodiment, since the cord 27 is passed once below the axial center line of the link, the force applied to the support collar 25 when the cord 27 is pulled acts not only in the direction of making the support collar 25 slide toward the shaft 4 against the force of compression spring 26 but also in the direction of making the link move downwardly although only a slight extent. Accordingly, the links 21 and 23 can be folded in two simply by pulling the tag 28 attached to the cord 27, and the frame is folded therewith.

Accordingly, the frame of the present invention can be folded extremely simply by sliding the support collar 25 and pressing the link and the like so that the pivot shaft 24 moves downwardly. Moreover, since the present invention is constituted so that a tensile load is mainly applied to an elongated member such as the lower stays 10 and the upper stay 20 in order to prevent buckling, it is possible to reduce the sectional area of such members correspondingly and decrease the weight of the frame.

According to the second embodiment, since the receiving bore 29 for the cord 27 is provided in the upper bracket 13 in the upper part of the seat pipe 11, it is unnecessary to slide the support collar 25 directly with the hand. Therefore, there is no possibility that a finger will be caught between the components, and it also becomes possible to fold the bicycle by pulling the tag 28 in a getting-off posture from the bicycle.

As will be fully understood from the foregoing description, according to the present invention, it is possible to provide a frame for a folding bicycle capable of being simply unfolded and folded as well as reducing the frame weight without impairing the strength.

We claim:

1. A frame for a folding bicycle comprising a triangular base frame means having a triangular configuration, said base frame means comprising a pair of back forks and a pair of lower stays joined to a pair of rear end members respectively, a main pipe interconnected between said pair of back forks and said pair of lower stays, a quadric link means connected to said triangular base frame means, said quadric link means comprising said main pipe, a seat pipe, a front pipe, and an upper stay, first pivotal means pivotally connecting said main pipe and said seat pipe to provide pivotal movement of said seat pipe relative to said main pipe, second pivotal means pivotally connecting said main pipe and said front pipe to provide pivotal movement of said front pipe relative to said main pipe, third pivotal means pivotally connecting said front pipe and said upper stay to provide pivotal movement between said front pipe and said upper stay, fourth pivotal means pivotally connecting said seat pipe and said upper stay to provide pivotal movement between said seat pipe and said upper stay, said quadric link means further comprising a foldable link means extending between said first and said third pivotal means, said foldable link means having a first position which maintains said quadric link means in an uncollapsed condition and a second position in which said quadric link means is in a collapsed condition, said triangular base frame means being maintained in said triangular configuration for both the first and second conditions of said quadric link means, said foldable link means comprises first and second link members pivotally connected to one another by a pivot connection, said foldable link means further comprising an operable means for maintaining said quadric link means in said uncollapsed condition, said operable means being operable to maintain said first and second link members generally in a co-extensive position such that the axes of said first and second link members are generally aligned, whereby said quadric link means is prevented from moving from said first to said second condition, said operable means being manually operable to permit said quadric link means to be collapsed and folded to said collapsed condition, said operable means further comprising a support collar movably mounted on said first and second link members, said collar having a first position extending about said pivot connection between said first and second link members to prevent relative pivotal movement between said first and second link members, and a second position spaced from said pivot connection to permit relative pivotal movement between said first and second link members, and, a remotely operated element operably connected to said collar for moving said collar from said one position to said second position.

2. A frame according to claim 1, wherein said collar is an elongated sleeve.

3. A frame according to claim 2 further comprising biasing means biasing said collar in said one position.

4. A frame according to claim 3, wherein said biasing means is a coil spring disposed about one of said first and second link members, and further comprising a stop element fixed to said first link member, said sleeve being biased against said stop element by said spring.

5. A frame according to claim 1, wherein said remotely operated element is a cord.

6. A frame according to claim 1, wherein said first pivotal means comprises a hanger bracket mounted on said main pipe, said hanger bracket having a first and second pivot connection, said seat pipe being pivotally mounted on said first pivot connection, said pair of back forks being pivotally mounted to said second pivotal connection.

7. A frame according to claim 6, wherein said second link member is pivotally mounted on said second pivot connection.

8. A frame according to claim 1, wherein said front pipe includes a head bracket, said upper stay being pivotally mounted on said head bracket.

9. A frame according to claim 1, wherein said second pivotal means comprises a front bracket mounted on said main pipe, said front pipe and said pair of lower stays being pivotally mounted on said front bracket.

* * * * *